United States Patent
Takahashi et al.

(10) Patent No.: US 9,064,529 B2
(45) Date of Patent: Jun. 23, 2015

(54) SPINDLE MOTOR AND DISK DRIVE APPARATUS

(71) Applicant: Nidec Corporation, Kyoto (JP)

(72) Inventors: Katsuya Takahashi, Kyoto (JP); Yuki Tajima, Kyoto (JP); Kazuhiro Sato, Kyoto (JP); Yuya Saito, Kyoto (JP); Hironori Ando, Kyoto (JP); Masahiro Shiraishi, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 14/458,465

(22) Filed: Aug. 13, 2014

(65) Prior Publication Data

US 2015/0055248 A1 Feb. 26, 2015

Related U.S. Application Data

(60) Provisional application No. 61/869,978, filed on Aug. 26, 2013, provisional application No. 61/896,392, filed on Oct. 28, 2013.

(51) Int. Cl.
*G11B 19/20* (2006.01)
*G11B 17/028* (2006.01)
*G11B 17/038* (2006.01)

(52) U.S. Cl.
CPC .......... *G11B 19/2009* (2013.01); *G11B 17/038* (2013.01); *G11B 17/0284* (2013.01)

(58) Field of Classification Search
CPC ............. G11B 17/0287; G11B 17/038; G11B 25/043; G11B 17/0284; G11B 19/2045; G11B 17/022; G11B 17/028; G11B 19/2009
USPC .......................................... 360/99.08, 99.12
See application file for complete search history.

(56) References Cited

U.S. PATENT DOCUMENTS

| 4,918,545 A * | 4/1990 | Scheffel ..................... 360/98.08 |
| 5,517,376 A * | 5/1996 | Green ......................... 360/98.08 |
| 5,801,901 A * | 9/1998 | Bryan et al. ................ 360/98.08 |

(Continued)

FOREIGN PATENT DOCUMENTS

| JP | 3-278365 A | 12/1991 |
| JP | 2001-35129 A | 2/2001 |
| JP | 2006-221741 A | 8/2006 |

OTHER PUBLICATIONS

English-machine translation of JP 2001-035129 A to Honda, published on Feb. 9, 2001.*
IBM Technical Disclosure Bulletin, "Method for Disk File Disk Clamping," Nov. 1981, vol. 24, iss. No. 6, pp. 2765-2766.*
Shiraishi et al.; "Method of Manufacturing Disk Drive Apparatus and Method of Manufacturing Spindle Motor"; U.S. Appl. No. 13/804,792, filed Mar. 14, 2013.

(Continued)

*Primary Examiner* — Will J Klimowicz
(74) *Attorney, Agent, or Firm* — Keating & Bennett, LLP (57) ABSTRACT

A spindle motor includes a recording disk and a clamper. A cylindrical portion includes a first screw portion positioned in an outer circumferential portion of the cylindrical portion. The clamper includes an annular raised portion configured to be fitted in a through hole of the recording disk. An inner circumferential portion of the clamper includes a second screw portion configured to be screwed to the first screw portion. At least a portion of the second screw portion is positioned in an inner circumferential portion of the annular raised portion. Each of the first screw portion and the second screw portion includes at least one of a screw groove and a screw thread. An axial position of at least a portion of the second screw portion overlaps with an axial position of the recording disk.

14 Claims, 6 Drawing Sheets

(56) References Cited

U.S. PATENT DOCUMENTS

| | | | |
|---|---|---|---|
| 6,040,957 A * | 3/2000 | Konings | 360/98.08 |
| 6,366,427 B1 * | 4/2002 | West | 360/99.12 |
| 8,737,018 B2 | 5/2014 | Shiraishi et al. | |
| 8,760,800 B1 | 6/2014 | Brown et al. | |
| 8,908,325 B1 * | 12/2014 | Heo et al. | 360/99.12 |

OTHER PUBLICATIONS

Shiraishi et al.; "Spindle Motor and Disk Drive Apparatus"; U.S. Appl. No. 13/804,855, filed Mar. 14, 2013.

* cited by examiner

SPINDLE MOTOR AND DISK DRIVE APPARATUS

BACKGROUND OF THE INVENTION

1. Field of the Invention

The present invention relates to a spindle motor and more specifically to a disk drive apparatus including a spindle motor.

2. Description of the Related Art

A spindle motor installed in a disk drive apparatus and configured to rotate a disk is known. A known spindle motor and a known disk drive apparatus are described, for example, in JP-A 03-278365. In the disk drive apparatus described in JP-A 03-278365, a female screw of a disk pressing body is screwed to a male screw defined in an outer circumference of a disk attachment member to securely hold a magnetic disk between a mounting flange and the disk pressing body.

In recent years, there has been a demand for a reduction in the thickness of disk drive apparatuses, and there has also been a demand for a reduction in the thickness of spindle motors installed in the disk drive apparatuses. An attempt to reduce the thickness of the spindle motor described in JP-A 03-278365 involves a reduction in the length of each of the male screw defined in the outer circumference of the disk attachment member and the female screw of the disk pressing body, making it impossible to securely fix the disk pressing body to the disk attachment member. Accordingly, a pressing force applied by the disk pressing body to the disk is reduced, so that it is made difficult to stably press the disk against the disk attachment member.

Therefore, there is a demand for a structure which enables the disk pressing body to be securely fixed to the disk attachment member to make it possible to stably press the disk against the disk attachment member.

SUMMARY OF THE INVENTION

A spindle motor according to a preferred embodiment of the present invention includes a recording disk including a through hole at a center thereof and an annular clamper installed therein. The spindle motor includes a rotating portion and a stationary portion. The rotating portion is configured to be rotatable about a central axis extending in a vertical direction. The rotating portion includes a rotor hub and a magnet. The magnet is fixed to the rotor hub. The stationary portion includes a stator arranged opposite to the magnet with a gap intervening therebetween. The rotor hub includes a flange portion and a cylindrical portion. The flange portion is arranged to extend radially around the central axis. The cylindrical portion is arranged to extend axially upward from an inner circumferential portion of the flange portion. The flange portion includes a disk mount surface arranged to be in contact with at least a portion of a lower surface of the recording disk. The cylindrical portion includes a first screw portion positioned in an outer circumferential portion of the cylindrical portion. The clamper includes an annular raised portion configured to be fitted in the through hole of the recording disk. An inner circumferential portion of the clamper includes a second screw portion configured to be screwed to the first screw portion. At least a portion of the second screw portion is positioned in an inner circumferential portion of the annular raised portion. The first screw portion includes at least one of a screw groove and a screw thread. The second screw portion includes at least one of a screw groove and a screw thread. An axial position of at least a portion of the second screw portion is arranged to overlap with an axial position of the recording disk.

According to a preferred embodiment of the present invention, an area where the first screw portion and the second screw portion are fastened to each other is increased. This contributes to increasing a pressing force applied by the clamper to the recording disk, and to stably pressing the recording disk against the rotor hub.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the accompanying drawings. It is assumed herein that a vertical direction is defined as a direction in which a central axis of a motor extends, and that an upper side and a lower side along the central axis of the motor are referred to simply as an upper side and a lower side, respectively. It should be noted, however, that the above definitions of the vertical direction and the upper and lower sides should not be construed to restrict relative positions or directions of different members or portions when the motor is actually installed in a device. Also note that directions parallel to or substantially parallel to the central axis are referred to by the term "axial direction", "axial", or "axially", that radial directions centered on the central axis are simply referred to by the term "radial direction", "radial", or "radially", and that a circumferential direction about the central axis is simply referred to by the term "circumferential direction", "circumferential", or "circumferentially".

Also note that the wording "parallel direction" as used herein comprehends both parallel and substantially parallel directions. Also note that the wording "perpendicular direction" as used herein comprehends both perpendicular and substantially perpendicular directions.

Figure 1:
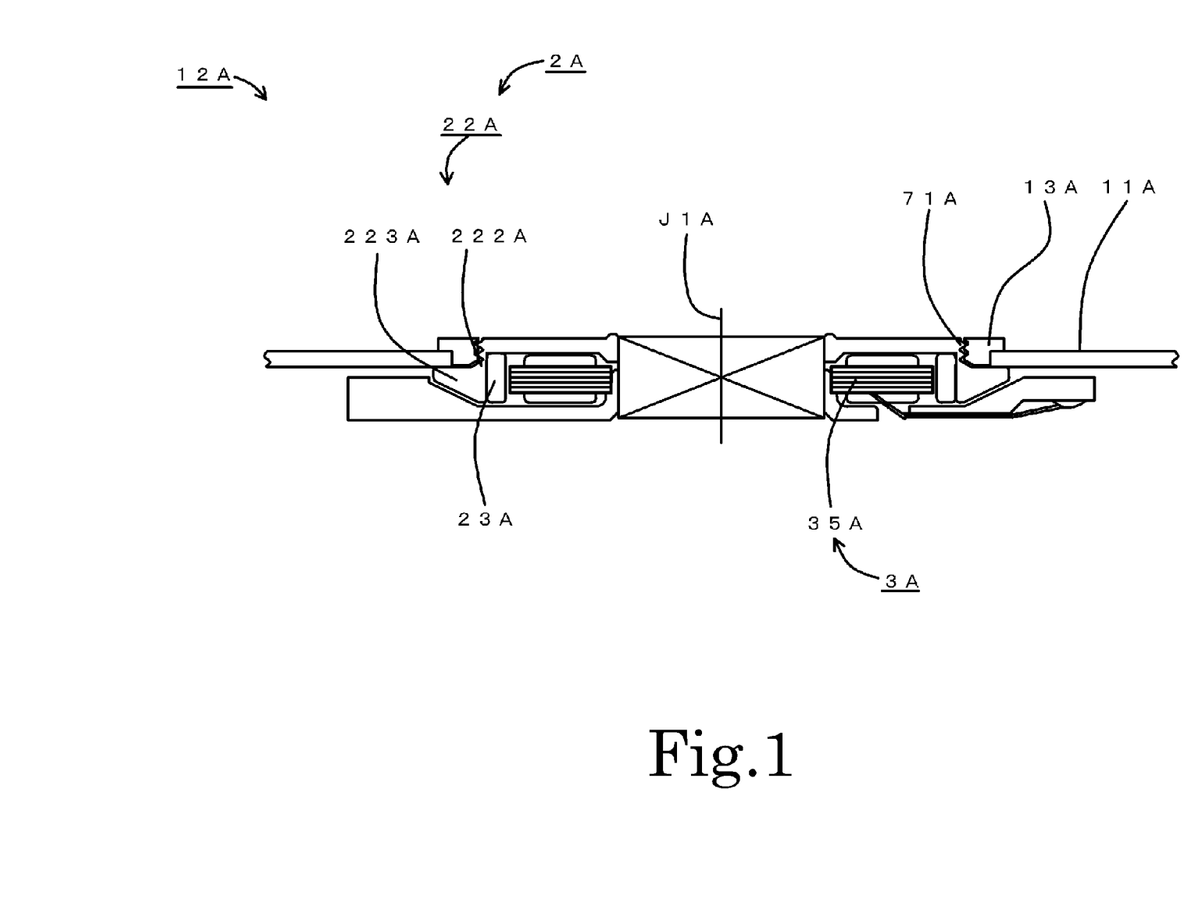
FIG. 1 is a schematic cross-sectional view of a spindle motor according to a first preferred embodiment of the present invention.

FIG. 1 is a cross-sectional view of a spindle motor 12A according to a first preferred embodiment of the present invention. The spindle motor 12A (hereinafter referred to simply as the motor 12A) preferably includes a recording disk 11A including a through hole at a center thereof and an annular clamper 13A installed therein.

The motor 12A includes a rotating portion 2A and a stationary portion 3A. The rotating portion 2A preferably includes a rotor hub 22A and a magnet 23A fixed to the rotor hub 22A. The rotating portion 2A is arranged to be rotatable about a central axis J1A extending in a vertical direction. The stationary portion 3A preferably includes a stator 35A arranged opposite to the magnet 23A with a gap intervening therebetween.

The rotor hub 22A includes a flange portion 223A and a cylindrical portion 222A. The flange portion 223A is arranged to extend radially around the central axis J1A. The cylindrical portion 222A is arranged to extend axially upward from an inner circumferential portion of the flange portion 223A. The cylindrical portion 222A includes a first screw portion 71A positioned in an outer circumferential portion of the cylindrical portion 222A.

Figure 2:
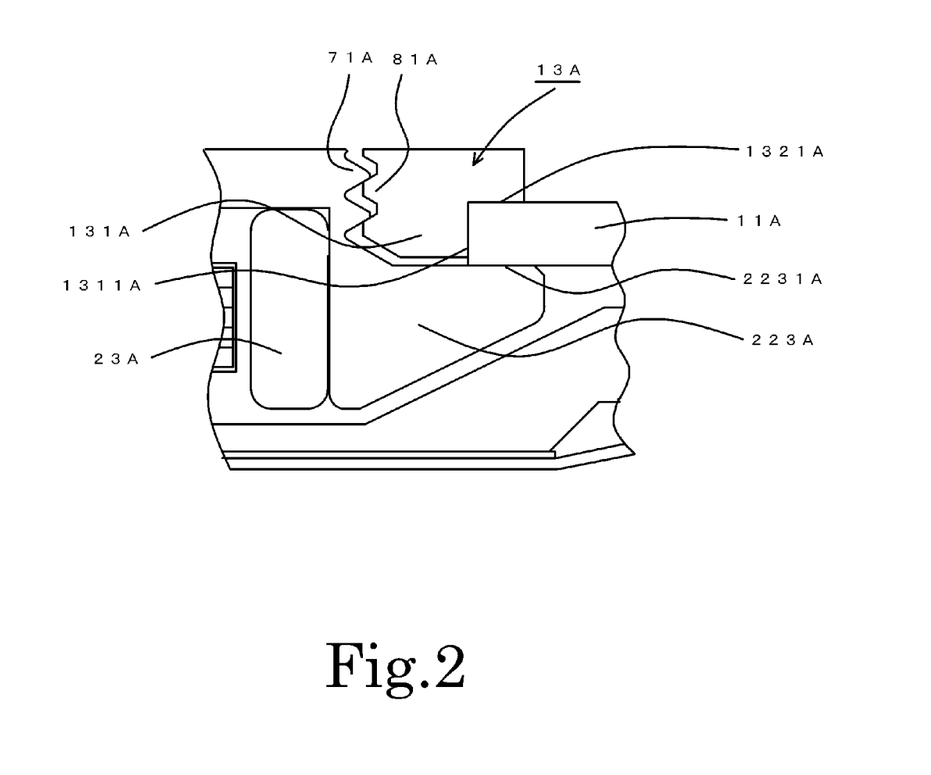
FIG. 2 is a schematic cross-sectional view of a clamper according to the first preferred embodiment of the present invention and its vicinity.

FIG. 2 is a schematic cross-sectional view of the clamper 13A according to the first preferred embodiment and its vicinity. The flange portion 223A preferably includes a disk mount surface 2231A arranged to be in contact with at least a portion of a lower surface of the recording disk 11A. The clamper 13A preferably includes an annular raised portion 131A arranged to be fitted in the through hole of the recording disk 11A. The annular raised portion 131A includes, in an outer circumferential surface thereof, an "annular raised portion outer circumferential surface" 1311A arranged radially opposite an inner circumferential surface of the recording disk 11A. In addition, an inner circumferential portion of the clamper 13A includes a second screw portion 81A arranged to be screwed to the first screw portion 71A, and at least a portion of the second screw portion 81A is positioned in an inner circumferential portion of the annular raised portion 131A. An entire area of the disk mount surface 2231A may be arranged to be in contact with the lower surface of the recording disk 11A. Note that it is preferable that about 50% or more of the disk mount surface 2231A is arranged to be in contact with the lower surface of the recording disk 11A.

The first screw portion 71A includes at least one of a screw groove and a screw thread. The second screw portion 81A includes at least one of a screw groove and a screw thread. The axial position of at least a portion of the second screw portion 81A is preferably arranged to overlap with the axial position of the recording disk 11A.

The overlapping of the axial position of at least a portion of the second screw portion 81A with the axial position of the recording disk 11A enables at least a portion of an area where the first screw portion 71A and the second screw portion 81A are fastened to each other and at least a portion of the recording disk 11A to be arranged at the same axial position. This contributes to securing a sufficient axial dimension of the area where the first screw portion 71A and the second screw portion 81A are fastened to each other, and to increasing a pressing force applied by the clamper 13A to the recording disk 11A. This in turn contributes to stably pressing the recording disk 11A against the rotor hub 22A.

The clamper 13A preferably includes a first lower surface 1321A arranged to extend radially, and positioned radially outward of the annular raised portion 131A. The first lower surface 1321A is arranged to be in contact with at least a portion of an upper surface of the recording disk 11A.

The recording disk 11A is arranged and fixed between the clamper 13A and the rotor hub 22A with the upper surface of the recording disk 11A in contact with the first lower surface 1321A and the lower surface of the recording disk 11A in contact with the disk mount surface 2231A. The recording disk 11A is thus stably pressed against the rotor hub 22A.

The radial position of the first lower surface 1321A is arranged to overlap with the radial position of the disk mount surface 2231A. That is, the recording disk 11A is fixed at a radial position where the recording disk 11A overlaps with both the first lower surface 1321A and the disk mount surface 2231A.

Overlapping of the radial position of the first lower surface 1321A with the radial position of the disk mount surface 2231A makes the radial position of a force which the recording disk 11A receives from the first lower surface 1321A and the radial position of a force which the recording disk 11A receives from the disk mount surface 2231A closer to each other. This contributes to preventing a deformation of the recording disk 11A. This in turn contributes to stably pressing the recording disk 11A against the rotor hub 22A.

Moreover, the radial dimension of the disk mount surface 2231A is preferably greater than the radial dimension of the first lower surface 1321A.

The recording disk 11A is pressed downward by the clamper 13A. In this case, the recording disk 11A is bent downward. However, arranging the radial dimension of the disk mount surface 2231A to be greater than the radial dimension of the first lower surface 1321A contributes to preventing the recording disk 11A from being bent downward by the clamper 13A. This in turn contributes to stably pressing the recording disk 11A against the rotor hub 22A.

The axial position of at least a portion of the second screw portion 81A is arranged to overlap with the axial position of the magnet 23A.

This contributes to securing a sufficient axial dimension of the magnet 23A. Securing a sufficient axial dimension of the magnet 23A contributes to increasing a torque of the motor 12A. Further, an increase in the axial dimension of the area where the first screw portion 71A and the second screw portion 81A are fastened to each other is achieved. This contributes to stably pressing the recording disk 11A against the rotor hub 22A while at the same time increasing the torque of the motor 12A.

Figure 3:
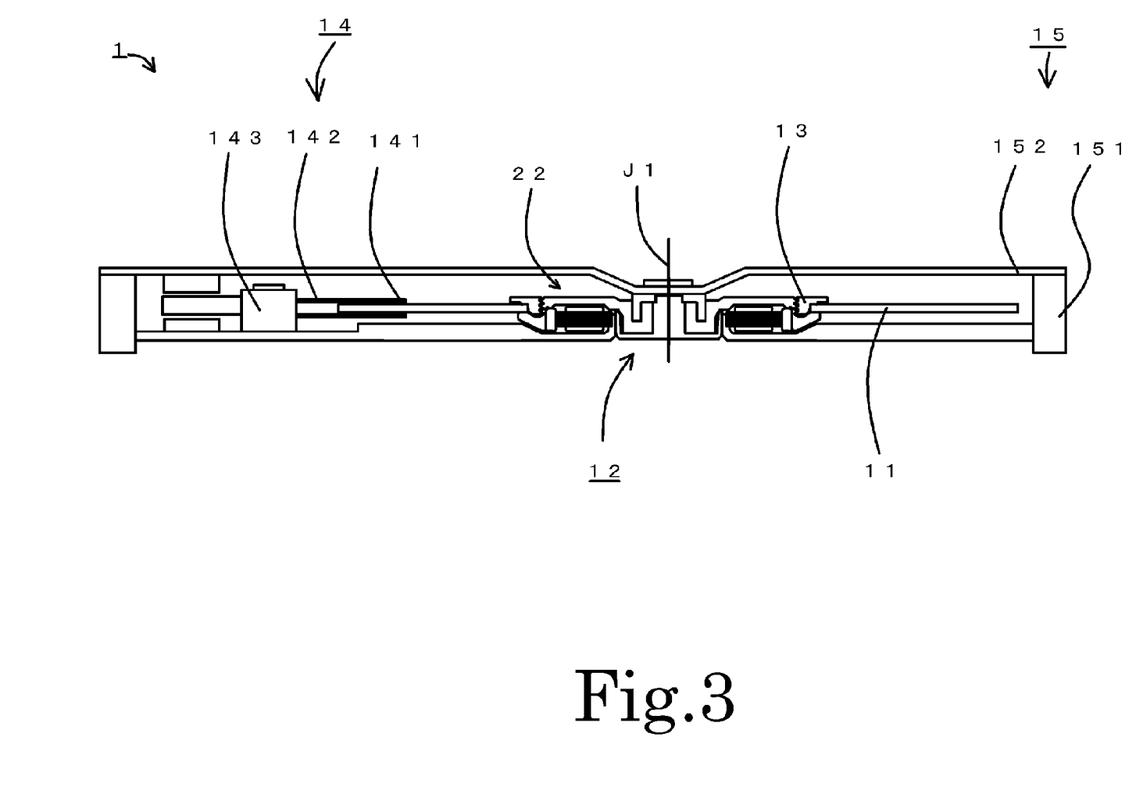
FIG. 3 is a schematic cross-sectional view of a disk drive apparatus according to a second preferred embodiment of the present invention.

FIG. 3 is a cross-sectional view illustrating the internal structure of a disk drive apparatus 1 including a spindle motor 12 (hereinafter referred to simply as a "motor 12") according to a second preferred embodiment of the present invention. The disk drive apparatus 1 is preferably a so-called hard disk drive. The disk drive apparatus 1 preferably includes, for example, a recording disk 11 on which information is recorded, the motor 12, a clamper 13, an access portion 14, and a housing 15. The recording disk 11 includes, at a center thereof, a through hole in which the clamper 13 is fitted. The motor 12 is arranged to rotate the recording disk 11. The access portion 14 is arranged to perform reading and writing of information from or to the recording disk 11. The access portion 14 preferably is configured to perform at least one of the reading and the writing of information from or to the recording disk 11.

As illustrated in FIG. 3, the housing 15 includes a cup-shaped or substantially cup-shaped lower housing member 151 and a plate-shaped upper plate member 152. The recording disk 11, the motor 12, and the access portion 14 are preferably accommodated inside the lower housing member 151. The upper plate member 152 is fixed to the lower housing member 151 to define the housing 15. An interior space of the disk drive apparatus 1 is preferably a clean space with no, or only an extremely small amount of, dirt or dust. According to the present preferred embodiment, the interior space of the disk drive apparatus 1 is preferably filled with an air. Note that the interior space of the disk drive apparatus 1 may alternatively be filled with, for example, helium gas, hydrogen gas, nitrogen gas, etc. Also note that the interior space of the disk drive apparatus 1 may alternatively be filled with a mixture of any of these gases and an air, if so desired.

The single recording disk 11 is preferably fixed to the motor 12 through the clamper 13. The detailed structure of the clamper 13 will be described below. The clamper 13 and a rotor hub 22 preferably are screwed to each other, so that the clamper 13 is fixed to the motor 12. The clamper 13 is thus fixed to the motor 12 to support the recording disk 11. Note that the number of recording disks 11 is not limited to one, but may be two or more, for example. In this case, the plurality of recording disks 11 are preferably fixed to the motor 12 through the clamper 13 and a spacer(s) (not shown).

The access portion 14 preferably includes, for example, two heads 141, two arms 142, and a head actuator mechanism 143. Each of the heads 141 is arranged in close proximity to the recording disk 11 to read and write information from or to the disk 11. Note that each head 141 may be configured to perform at least one of the reading and the writing of information. Each arm 142 is configured to support a separate one of the heads 141. The head actuator mechanism 143 is configured to move each arm 142 to move an associated one of the heads 141 relative to the recording disk 11. The head actuator mechanism 143 enables each head 141 to make access to a desired location on the recording disk 11 with the head 141 being arranged in close proximity to the rotating recording disk 11.

Figure 4:
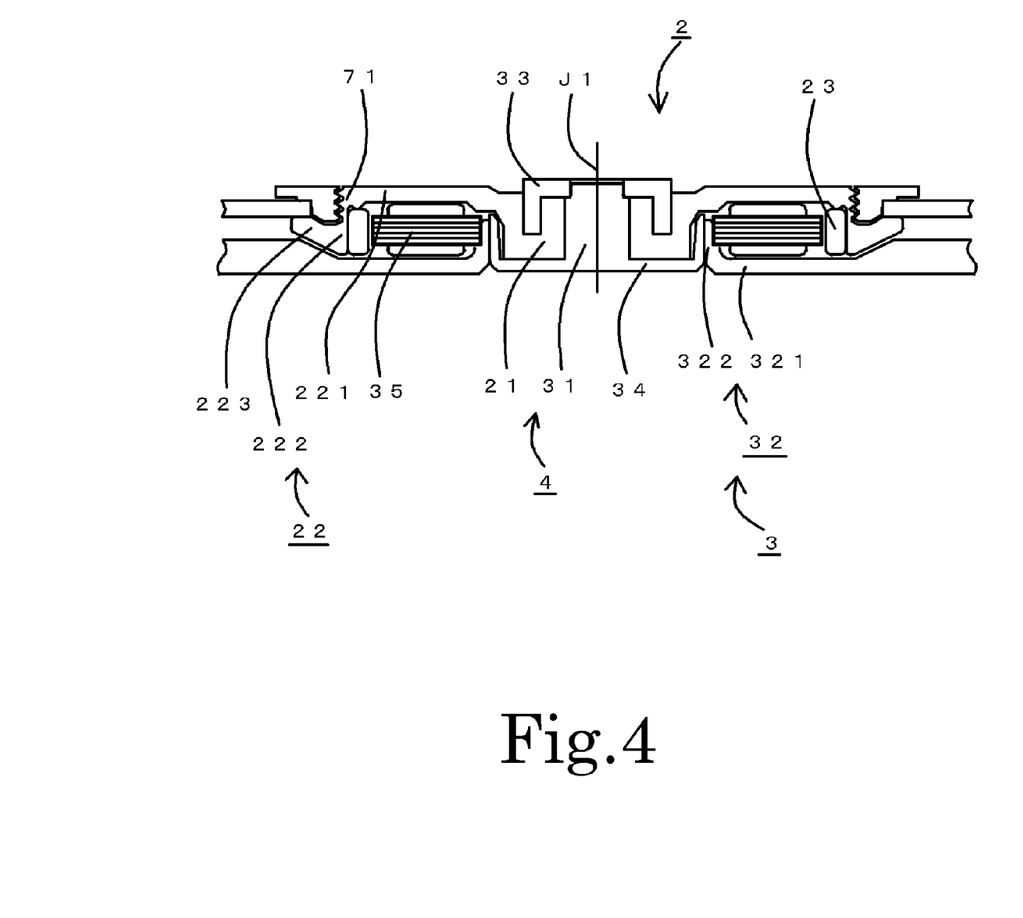
FIG. 4 is a schematic cross-sectional view of a spindle motor according to the second preferred embodiment of the present invention.

FIG. 4 is a schematic cross-sectional view of the motor 12 according to the second preferred embodiment.

The motor 12 is preferably an outer-rotor motor. The motor 12 includes a rotating portion 2 and a stationary portion 3. The motor 12 preferably includes the recording disk 11 and the clamper 13 installed thereto. The rotating portion 2 is supported through the stationary portion 3 to be rotatable about a central axis J1 extending in the vertical direction.

The stationary portion 3 preferably includes a shaft 31, a base portion 32, a plate portion 33, a cup portion 34, and a stator 35.

The shaft 31 is arranged along the central axis J1 extending in the vertical direction, and is preferably columnar or substantially columnar in shape. The plate portion 33 is fixed to the shaft 31 in the vicinity of an upper end portion thereof. In addition, the cup portion 34 is arranged in the vicinity of a lower end portion of the shaft 31. The shaft 31 is preferably made, for example, of a metal, such as stainless steel, steel, iron, aluminum, etc.

Moreover, the upper end portion of the shaft 31 is fixed to the upper plate member 152 of the disk drive apparatus 1 (see FIG. 3). The lower end portion of the shaft 31 is fixed to the base portion 32 through the cup portion 34.

The base portion 32 includes a hole portion (not shown) defined at a center thereof. The base portion 32 preferably includes a plate portion 321 arranged to extend radially, and a cylindrical or substantially cylindrical holder portion 322 arranged to project upward from an inner edge of the plate portion 321. The base portion 32 is preferably arranged to define at least a portion of the lower housing member 151. Note, however, that the base portion 32 and the lower housing member 151 may be defined by a single continuous monolithic member if so desired. Also note that the base portion 32 and the lower housing member 151 may be defined by separate members. The base portion 32 is preferably made, for example, of a metal, such as an aluminum alloy, steel, stainless steel, iron, etc.

The plate portion 33 is an annular or substantially annular member fixed to an outer circumferential surface of the shaft 31. The plate portion 33 is arranged to surround the shaft 31. The plate portion 33 is preferably, for example, press fitted to the shaft 31 in the vicinity of the upper end portion of the shaft 31, and fixed to the shaft 31 through an adhesive, for example. Note, however, that the shaft 31 and the plate portion 33 may alternatively be defined by a single continuous monolithic member, if so desired. The plate portion 33 is preferably made, for example, of a resin or a metal including copper as a main component.

The cup portion 34 is an annular portion arranged in the vicinity of the lower end portion of the shaft 31. According to the present preferred embodiment, the shaft 31 and the cup portion 34 are preferably defined by a single continuous monolithic member. Note, however, that the shaft 31 and the cup portion 34 may alternatively be defined by separate members. The cup portion 34 is preferably made, for example, of a resin or a metal including copper as a main component. An outer circumferential surface of the cup portion 34 is fixed to an inner circumferential surface of the holder portion 322 of the base portion 32.

The stator 35 is fitted to the base portion 32. The stator 35 is arranged to produce a turning force (i.e., a torque) centered on the central axis J1 between the stator 35 and a magnet 23 arranged around the shaft 31. That is, the stator 35 and the magnet 23, which will be described below, together define a driving mechanism to rotate the rotating portion 2 with respect to the stationary portion 3.

The rotating portion 2 preferably includes a sleeve 21, the rotor hub 22, and the magnet 23.

The sleeve 21 is cylindrical or substantially cylindrical in shape, and includes an inner circumferential surface arranged opposite to the outer circumferential surface of the shaft 31. The sleeve 21 is preferably configured to rotate about the central axis J1 around the shaft 31. The inner circumferential surface of the sleeve 21 and the outer circumferential surface of the shaft 31 are arranged radially opposite each other with a slight gap intervening therebetween. An upper end portion of an outer circumferential surface of the sleeve 21 and its vicinity are joined to the rotor hub 22.

The rotor hub 22 includes a top plate portion 221, a cylindrical portion 222, and a flange portion 223. The top plate portion 221 is preferably a disk-shaped or substantially disk-shaped portion arranged to extend radially outward from an upper end of the sleeve 21. The cylindrical portion 222 is a cylindrical or substantially cylindrical portion arranged to extend downward from an outer edge of the top plate portion 221. The flange portion 223 is a projecting portion arranged to extend radially outward from a lower end of the cylindrical portion 222. As illustrated in FIG. 4, an outer circumferential portion of the cylindrical portion 222 preferably includes a first screw portion 71 to which the clamper 13 is screwed. The structure of the first screw portion 71 and its vicinity will be described below.

According to the present preferred embodiment, the sleeve 21 and the rotor hub 22 are preferably defined by a single continuous monolithic member. Note, however, that the sleeve 21 and the rotor hub 32 may alternatively be defined by separate members.

The magnet 23 is fixed to an inner circumferential surface of the cylindrical portion 222 of the rotor hub 22. The magnet 23 is annular in shape, and is centered on the central axis J1. The magnet 23 is arranged opposite to the stator 35 with a gap intervening therebetween. According to the present preferred embodiment, an inner circumferential surface of the magnet 23 is arranged radially opposite an outer circumferential surface of each of a plurality of teeth of the stator 35. In addition, the inner circumferential surface of the magnet 23 is a pole surface in which north and south poles are arranged alternately. A neodymium bonded magnet is preferably used as the magnet 23. Note that a plurality of magnets may alternatively be used in place of the annular magnet 23. In the case where the plurality of magnets are used, the magnets are preferably arranged in a circumferential direction such that north and south poles alternate with each other.

The rotating portion 2 is supported through a bearing mechanism 4 to be rotatable with respect to the stationary portion 3. According to the present preferred embodiment, the bearing mechanism 4 is preferably a fluid bearing mechanism defined by the sleeve 21, a combination of the shaft 31, the plate portion 33, and the cup portion 34, and a lubricating fluid arranged to intervene therebetween. Note, however, that a bearing of another type, such as, for example, a ball bearing or a plain bearing, may be used instead of the fluid bearing mechanism.

Figure 5:
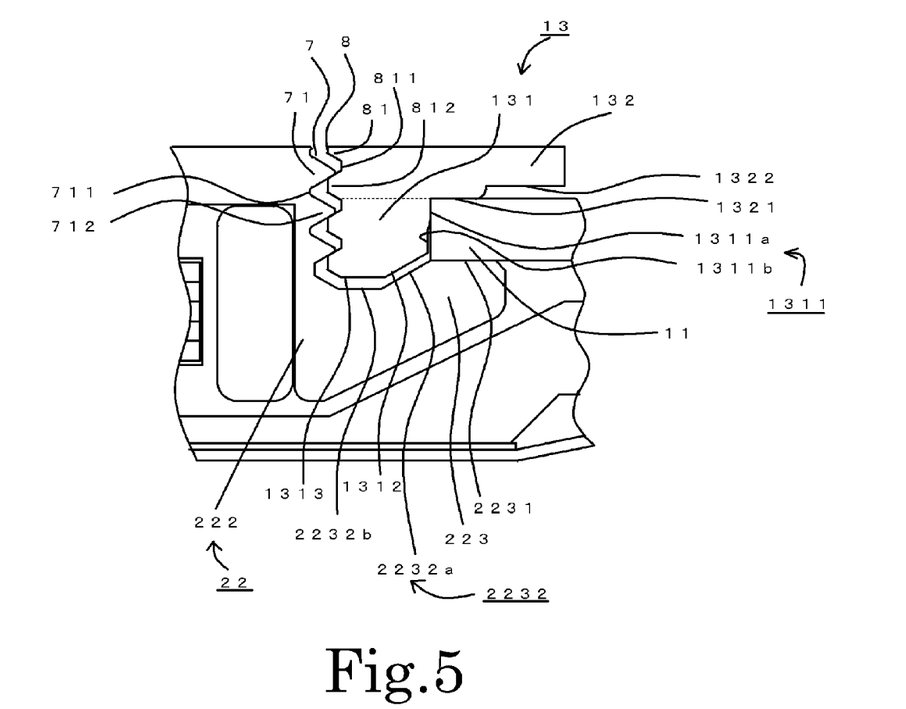
FIG. 5 is a schematic cross-sectional view of a clamper according to the second preferred embodiment of the present invention and its vicinity.

Fixing of the rotor hub 22, the clamper 13, and the recording disk 11 will now be described below. FIG. 5 is a schematic cross-sectional view of the clamper 13 according to the second preferred embodiment and its vicinity.

An inner circumferential portion of the clamper 13 preferably includes a clamper inner circumferential surface 8, which is an annular or substantially annular inner circumferential surface of the clamper 13. A second screw portion 81 is arranged in the clamper inner circumferential surface 8. That is, the clamper 13 includes the second screw portion 81 in the clamper inner circumferential surface 8. The clamper 13 includes an annular raised portion 131 and a flat plate portion 132. The annular raised portion 131 and the flat plate portion 132 are preferably defined by a single monolithic member. The annular raised portion 131 is fitted in the through hole of the recording disk 11. The flat plate portion 132 is arranged to extend radially outward from an upper end of the annular raised portion 131. As described above, the first screw portion 71, to which the clamper 13 preferably is screwed, is preferably arranged in the outer circumferential surface 7 of the cylindrical portion 222. When the clamper 13 preferably is screwed and thus fixed to the rotor hub 22 in a process of assembling the motor 12, the second screw portion 81 preferably is screwed to the first screw portion 71, so that the clamper 13 is fixed to the rotor hub 22.

As illustrated in FIG. 5, the first screw portion 71 preferably includes first screw grooves 711 and first screw threads 712 in a section including the central axis J1. The first screw grooves 711 are preferably a collection of a plurality of grooves arranged in an axial direction in the section including the central axis J1. The first screw threads 712 are preferably a collection of a plurality of projection portions arranged in the axial direction in the section including the central axis J1. Each first screw groove 711 is recessed radially inward relative to a top portion of each first screw thread 712. Each first screw thread 712 projects radially outward relative to a bottom portion of each first screw groove 711. The first screw grooves 711 are arranged adjacent to the first screw threads 712.

Note that the number of first screw grooves 711 and the number of first screw threads 712 arranged in the section including the central axis J1 are each at least one, and may each be two or more than two, for example. It is preferable, however, that the number of first screw grooves 711 and the number of first screw threads 712 should each be two, three, or four in any section including the central axis J1.

The second screw portion 81 preferably includes second screw grooves 811 and second screw threads 812 in a section including the central axis J1. The second screw grooves 811 are a collection of a plurality of grooves arranged in the axial direction in the section including the central axis J1. The second screw threads 812 are preferably a collection of a plurality of projection portions arranged in the axial direction in the section including the central axis J1. Each second screw groove 811 is recessed radially outward relative to a top portion of each second screw thread 812. Each second screw thread 812 projects radially inward relative to a bottom portion of each second screw groove 811. The second screw grooves 811 are arranged adjacent to the second screw threads 812.

Note that the number of second screw grooves 811 and the number of second screw threads 812 arranged in the section including the central axis J1 are each at least one, and may each be two or more than two. It is preferable, however, that the number of second screw grooves 811 and the number of second screw threads 812 should each be two, three, or four in any section including the central axis J1.

When the clamper 13 is screwed and thus fixed to the rotor hub 22 in the process of assembling the motor 12, the first screw grooves 711 and the second screw threads 812, and the first screw threads 712 and the second screw grooves 811, engage with each other, such that the clamper 13 is fixed to the rotor hub 22.

The annular raised portion 131 of the clamper 13 is preferably fitted in the through hole positioned in an inner circumferential surface of the recording disk 11. In addition, at least a portion of the second screw portion 81 is positioned in an inner circumferential portion of the annular raised portion 131, and the second screw portion 81 is screwed to the first screw portion 71. That is, a position where the first screw portion 71 and the second screw portion 81 are fastened to each other is positioned radially inward of the inner circumferential surface of the recording disk 11.

Positioning the annular raised portion 131 radially inward of the recording disk 11 makes it possible to provide an area where the first screw portion 71 and the second screw portion 81 are fastened to each other and the recording disk 11 to radially overlap with each other. This contributes to reducing the thickness of the motor 12, and to increasing the axial dimension of the area where the first screw portion 71 and the second screw portion 81 are fastened to each other. This in turn contributes to stably pressing the recording disk 11 against the rotor hub 22.

The axial position of at least a portion of the second screw portion 81 is arranged to overlap with the axial position of the recording disk 11. That is, the axial position of the area where the first screw portion 71 and the second screw portion 81 are fastened to each other is arranged to overlap with the axial position of the recording disk 11. In addition, the axial dimension of the second screw portion 81 is arranged to be greater than the axial dimension of the inner circumferential surface of the recording disk 11.

Overlapping of the axial position of at least a portion of the second screw portion 81 with the axial position of the recording disk 11 enables at least a portion of the area where the first screw portion 71 and the second screw portion 81 are fastened to each other and at least a portion of the recording disk 11 to be arranged at the same axial position. This contributes to securing a sufficient axial dimension of the area where the first screw portion 71 and the second screw portion 81 are fastened to each other, and to increasing a pressing force applied by the clamper 13 to the recording disk 11. This in turn contributes to stably pressing the recording disk 11 against the rotor hub 22.

The flat plate portion 132 of the clamper 13 preferably includes a first lower surface 1321 and a second lower surface 1322. The first lower surface 1321 is positioned radially outward of the annular raised portion 131, and is arranged to extend radially. In addition, the first lower surface 1321 is arranged to be in contact with at least a portion of an upper surface of the recording disk 11. The second lower surface 1322 is positioned radially outward of the first lower surface 1321, and the second lower surface 1322 is arranged opposite to the upper surface of the recording disk 11 with a gap intervening therebetween.

The flange portion 223 preferably includes an annularly extending disk mount surface 2231 arranged to be in contact with at least a portion of a lower surface of the recording disk 11. As described above, the upper surface of the recording disk 11 is arranged to be in contact with the first lower surface 1321 of the flat plate portion 132. In addition, the lower surface of the recording disk 11 is arranged to be in contact with the disk mount surface 2231. That is, the recording disk 11 is arranged between the first lower surface 1321 and the disk mount surface 2231, and is thus fixed to the motor 12.

Thus, the recording disk 11 is stably pressed against the flange portion 223 of the rotor hub 22.

Moreover, the radial position of the first lower surface 1321 is arranged to overlap with the radial position of the disk mount surface 2231.

Overlapping of the radial position of the first lower surface 1321 with the radial position of the disk mount surface 2231 makes the radial position of a force which the recording disk 11 receives from the first lower surface 1321 and the radial position of a force which the recording disk 11 receives from the disk mount surface 2231 closer to each other. This contributes to preventing a deformation of the recording disk 11. This in turn contributes to stably pressing the recording disk 11 against the rotor hub 22.

Moreover, the radial dimension of the disk mount surface 2231 is preferably greater than the radial dimension of the first lower surface 1321.

The recording disk 11 is pressed downward by the clamper 13. In this case, the recording disk 11 is subjected to a downward bending force. However, arranging the radial dimension of the disk mount surface 2231 to be greater than the radial dimension of the first lower surface 1321 contributes to preventing the recording disk 11 from being bent downward by the clamper 13. This in turn contributes to stably pressing the recording disk 11 against the rotor hub 22.

Note that the radial dimension of the disk mount surface 2231 may be equal or substantially equal to the radial dimension of the first lower surface 1321, for example. In this case, an area where the clamper 13 and the recording disk 11 are in contact with each other is equal or substantially equal in size to an area where the recording disk 11 and the disk mount surface 2231 are in contact with each other. This contributes to more stably pressing the recording disk 11 against the rotor hub 22. Also note that the radial dimension of the disk mount surface 2231 may alternatively be smaller than the radial dimension of the first lower surface 1321.

The second lower surface 1322 is arranged opposite to the upper surface of the recording disk 11 with an annularly extending axial gap intervening therebetween. Although the axial gap preferably is annular, that is, extends in a circle in the circumferential direction according to the present preferred embodiment, the present invention is not limited to the present preferred embodiment. For example, it may be so arranged that the entire first lower surface 1321 and a portion of the second lower surface 1322 are arranged to be in contact with the upper surface of the recording disk 11, and that the flat plate portion 132 includes a plurality of recessed portions each of which is recessed upward and each of which includes a portion of the second lower surface 1322 as an upper surface thereof, with the result that the second lower surface 1322 is arranged opposite to the upper surface of the recording disk 11 with axial gaps intervening therebetween.

The annular raised portion 131 preferably includes an "annular raised portion outer circumferential surface" 1311 arranged radially opposite the inner circumferential surface of the recording disk 11. In more detail, the annular raised portion outer circumferential surface 1311 includes a first outer circumferential surface 1311a arranged to be in contact with the inner circumferential surface of the recording disk 11, and a second outer circumferential surface 1311b positioned below the first outer circumferential surface 1311a, and arranged opposite to the inner circumferential surface of the recording disk 11 with a radial gap intervening therebetween.

Radial positioning of the recording disk 11 with respect to the clamper 13 is easily achieved by the first outer circumferential surface 1311a making contact with the inner circumferential surface of the recording disk 11. This enables the recording disk 11 to be arranged in parallel or substantially parallel with the disk mount surface 2231. This makes it possible to stably press the recording disk 11 against the rotor hub 22. In addition, a reduction in the likelihood that, when the clamper 13 is fitted to the recording disk 11, contamination of the recording disk 11 will occur as a result of an upper end of the inner circumferential surface of the recording disk 11 making contact with a lower end of the annular raised portion outer circumferential surface 1311 is achieved.

According to the present preferred embodiment, the axial dimension of the first outer circumferential surface 1311a and the axial dimension of the second outer circumferential surface 1311b are preferably equal or substantially equal to each other. Note, however, that, the axial dimension of the first outer circumferential surface 1311a may be greater than the axial dimension of the second outer circumferential surface 1311b. Also note that the axial dimension of the second outer circumferential surface 1311b may be greater than the axial dimension of the first inner circumferential surface 1311a. Also note that the second outer circumferential surface 1311b and the inner circumferential surface of the recording disk 11 may be arranged to be in contact with each other, with the first outer circumferential surface 1311a and the inner circumferential surface of the recording disk 11 arranged to be opposite to each other with a gap intervening therebetween. Also note that the entire annular raised portion outer circumferential surface 1311 and the inner circumferential surface of the recording disk 11 may be arranged to be in contact with each other.

The flange portion 223 preferably includes an annular recessed portion 2232. The annular recessed portion 2232 includes a "recessed portion slanting surface" 2232a and a bottom portion 2232b. The recessed portion slanting surface 2232a is arranged to extend downward and radially inward from a radially inner end of the disk mount surface 2231. The bottom portion 2232b is arranged to extend radially inward from a lower end of the recessed portion slanting surface 2232a to be joined to the first screw portion 71. The recessed portion slanting surface 2232a and the bottom portion 2232b are arranged opposite to the annular raised portion 131 with a gap intervening therebetween.

The annular recessed portion 2232 is positioned radially inside the disk mount surface 2231, and is arranged to accommodate at least a portion of the annular raised portion 131. The bottom portion 2232b of the annular recessed portion 2232, which will be described below, is preferably positioned at an axial level lower than that of the recording disk 11.

Arrangement of the annular recessed portion 2232 in the flange portion 223 contributes to lengthening both the first screw portion 71 and the second screw portion 81 in the axial direction. In addition, the second screw portion 81 can be lengthened in the axial direction by at least a portion of the annular raised portion 131 being positioned in the annular recessed portion 2232.

Further, the area where the first screw portion 71 and the second screw portion 81 are fastened to each other can be lengthened by positioning the bottom portion 2232b of the annular recessed portion 2232 at an axial level lower than that of the lower surface of the recording disk 11. This contributes to securely fixing the clamper 13 to the rotor hub 22. This in turn contributes to more stably pressing the recording disk 11 against the rotor hub 22.

Note that a lower surface of the annular recessed portion 2232 may be provided by only the bottom portion 2232b or only the recessed portion slanting surface 2232a, for example.

The annular raised portion 131 preferably includes a "raised portion slanting surface" 1312 and a "raised portion lower surface" 1313. The raised portion slanting surface 1312 is arranged to extend downward and radially inward from a lower end of the annular raised portion outer circumferential surface 1311. The raised portion lower surface 1313 is arranged to extend radially inward from a lower end of the raised portion slanting surface 1312. The raised portion lower surface 1313 is preferably arranged opposite to the bottom portion 2232b with a gap intervening therebetween. The raised portion slanting surface 1312 is arranged opposite to the recessed portion slanting surface 2232b with a gap intervening therebetween.

Note that a lower surface of the annular raised portion 131 may be provided by only the raised portion lower surface 1312 or only the raised portion slanting surface 1312. In the case where the lower surface of the annular recessed portion 2232 is provided by only the recessed portion slanting surface 2232a, the lower surface of the annular raised portion 131 is preferably provided by only the raised portion slanting surface 1312.

The axial position of at least a portion of the second screw portion 81 is preferably arranged to overlap with the axial position of the magnet 23. That is, the axial position of the area where the first screw portion 71 and the second screw portion 81 are fastened to each other is arranged to overlap with the axial position of the magnet 23.

This contributes to securing a sufficient axial dimension of the magnet 23. Securing a sufficient axial dimension of the magnet 23 contributes to increasing a torque of the motor 12. Further, an increase in the axial dimension of the area where the first screw portion 71 and the second screw portion 81 are fastened to each other is achieved. This contributes to stably pressing the recording disk 11 against the rotor hub 22 while at the same time increasing the torque of the motor 12.

Further, according to the present preferred embodiment, the axial position of the magnet 23, the axial position of the first screw portion 71, the axial position of the second screw portion 81, and the axial position of the recording disk 11 are preferably arranged to overlap with one another. That is, the magnet 23, an area where the clamper 13 and the rotor hub 22 are fastened to each other, and the recording disk 11 are arranged to radially overlap with one another. This contributes to further reducing the thickness of the motor 12.

While preferred embodiments of the present invention have been described above, it will be understood that the present invention is not limited to the above-described preferred embodiments.

Figure 6:
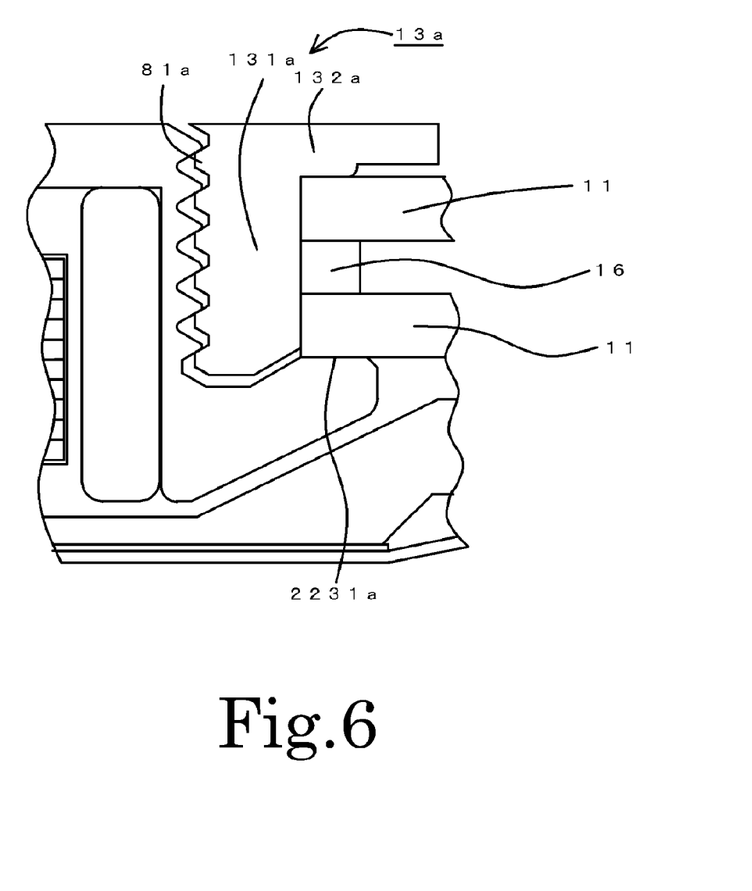
FIG. 6 is a schematic cross-sectional view of a clamper according to an example modification of the second preferred embodiment of the present invention and its vicinity.

FIG. 6 is a schematic cross-sectional view illustrating a clamper 13a according to an example modification of the second preferred embodiment of the present invention and its vicinity. The basic structure of the example modification is preferably the same as that of the motor 12 according to the preferred embodiment.

As illustrated in FIG. 6, the number of recording disks 11 is preferably two according to the example modification. The two recording disks 11 are spaced from each other in a direction parallel to a central axis J1 of a motor 12, and are fixed. The lower recording disk 11 is arranged on a disk mount surface 2231a, and a spacer 16 is arranged above the lower recording disk 11. Then, the upper recording disk 11 is arranged above the spacer 16. An inner circumferential surface of each of the lower and upper recording disks 11 is arranged to be in contact with an outer circumferential surface of an annular raised portion 131a of the clamper 13a, such that both the lower and upper recording disks 11 are radially positioned. The upper recording disk 11 is arranged to be in contact with both a lower surface of a flat plate portion 132a and an upper surface of the spacer 16. The lower recording disk 11 is arranged to be in contact with both a lower surface of the spacer 16 and the disk mount surface 2231a. The axial dimension of a second screw portion 81a is preferably arranged to be about twice or more than twice the axial dimension of the inner circumferential surface of each recording disk 11.

A spindle motor according to various preferred embodiments of the present invention or modifications thereof may be either of a rotating-shaft type or of a fixed-shaft type. Also, a spindle motor according to various preferred embodiments of the present invention or modifications thereof may be either of an outer-rotor type or of an inner-rotor type.

While preferred embodiments of the present invention and modifications thereof have been described above, it will be understood that the present invention is not limited to the above-described preferred embodiments and modifications.

Also, spindle motors according to preferred embodiments of the present invention and modifications thereof may be used not only in disk drive apparatuses but also in a variety of other electronic devices, such as, for example, fans, automotive applications, etc.

Features of the above-described preferred embodiments and the modifications thereof may be combined appropriately as long as no conflict arises.

While preferred embodiments of the present invention and modifications thereof have been described above, it is to be understood that variations and modifications will be apparent to those skilled in the art without departing from the scope and spirit of the present invention. The scope of the present invention, therefore, is to be determined solely by the following claims.

What is claimed is:

1. A spindle motor and recording disk combination including a through hole at a center thereof and an annular clamper installed thereon, the spindle motor comprising:
   a rotating portion including a rotor hub and a magnet fixed to the rotor hub, and configured to be rotatable about a central axis extending in a vertical direction; and
   a stationary portion including a stator opposite to the magnet with a gap intervening therebetween; wherein the rotor hub includes:
- a flange portion extending radially around the central axis; and
- a cylindrical portion extending axially upward from an inner circumferential portion of the flange portion;

the flange portion includes a disk mount surface contacting with at least a portion of a lower surface of the recording disk;

the cylindrical portion includes a first screw portion positioned in an outer circumferential portion of the cylindrical portion;

the clamper includes an annular raised portion configured to be fitted in the through hole of the recording disk;

an inner circumferential portion of the clamper includes a second screw portion configured to be screwed to the first screw portion;

at least a portion of the second screw portion is positioned in an inner circumferential portion of the annular raised portion;

the first screw portion includes at least one of a screw groove and a screw thread;

the second screw portion includes at least one of a screw groove and a screw thread; and an axial position of at least a portion of the second screw portion overlaps with an axial position of the recording disk.

2. The spindle motor and recording disk combination according to claim 1, wherein
- the clamper includes a first lower surface extending radially, and positioned radially outward of the annular raised portion; and
- the first lower surface is in contact with at least a portion of an upper surface of the recording disk.

3. The spindle motor and recording disk combination according to claim 2, wherein a radial position of the first lower surface overlaps with a radial position of the disk mount surface.

4. The spindle motor and recording disk combination according to claim 2, wherein a radial dimension of the disk mount surface is substantially equal to or greater than a radial dimension of the first lower surface.

5. The spindle motor and recording disk combination according to claim 2, wherein a radial dimension of the disk mount surface is smaller than a radial dimension of the first lower surface.

6. The spindle motor and recording disk combination according to claim 2, wherein
- the clamper includes a flat plate portion extending radially;
- the flat plate portion includes a second lower surface positioned radially outward of the first lower surface; and
- the second lower surface is arranged opposite to the upper surface of the recording disk with a gap intervening therebetween.

7. The spindle motor and recording disk combination according to claim 1, wherein the annular raised portion includes, in an outer circumferential surface thereof, an annular raised portion outer circumferential surface arranged radially opposite to an inner circumferential surface of the recording disk.

8. The spindle motor and recording disk combination according to claim 7, wherein the annular raised portion outer circumferential surface includes a first outer circumferential surface in contact with the inner circumferential surface of the recording disk, and a second outer circumferential surface positioned below the first outer circumferential surface, and arranged opposite to the inner circumferential surface of the recording disk with a gap intervening therebetween.

9. The spindle motor and recording disk combination according to claim 1, wherein
- the flange portion includes an annular recessed portion positioned radially inside the disk mount surface, and configured to accommodate at least a portion of the annular raised portion; and
- a bottom portion of the annular recessed portion is positioned at an axial level lower than an axial level of the lower surface of the recording disk.

10. The spindle motor and recording disk combination according to claim 9, wherein
- the annular recessed portion includes a recessed portion slanting surface extending downward and radially inward from a radially inner end of the disk mount surface; and
- both the recessed portion slanting surface and the bottom portion are arranged opposite to the annular raised portion with a gap intervening therebetween.

11. The spindle motor and recording disk combination according to claim 1, wherein the axial position of at least a portion of the second screw portion overlaps with an axial position of the magnet.

12. The spindle motor and recording disk combination according to claim 1, wherein an axial dimension of the second screw portion is greater than an axial dimension of an inner circumferential surface of the recording disk.

13. The spindle motor and recording disk combination according to claim 1, wherein an axial dimension of the second screw portion is twice or more than twice an axial dimension of an inner circumferential surface of the recording disk.

14. A disk drive apparatus comprising the spindle motor and recording disk combination as recited in claim 1, comprising:
- a head configured to perform at least one of reading and writing of information from or to the recording disk;
- a head actuator mechanism configured to move the head relative to the recording disk; and
- a housing member configured to surround the recording disk, the spindle motor, the head, and the head actuator mechanism wherein
the spindle motor is configured to rotate the recording disk.

* * * * *